(12) United States Patent
Brooks

(10) Patent No.: US 6,915,928 B2
(45) Date of Patent: Jul. 12, 2005

(54) FLUID DISPENSER

(75) Inventor: Peter Everett Brooks, Rochester, MN (US)

(73) Assignee: Pemstar, Inc., Rochester, MN (US)

( * ) Notice: Subject to any disclaimer, the term of this patent is extended or adjusted under 35 U.S.C. 154(b) by 97 days.

(21) Appl. No.: 09/991,357

(22) Filed: Nov. 20, 2001

(65) Prior Publication Data

US 2002/0100774 A1 Aug. 1, 2002

Related U.S. Application Data

(60) Provisional application No. 60/264,870, filed on Jan. 29, 2001.

(51) Int. Cl.[7] .................................................. B67D 5/06
(52) U.S. Cl. ...................... 222/504; 222/420; 222/422; 118/241
(58) Field of Search ................................ 222/504, 420, 222/422; 251/65; 118/241–242, 304; 156/575, 578

(56) References Cited

U.S. PATENT DOCUMENTS

| | | | | |
|---|---|---|---|---|
| 3,164,304 A | * | 1/1965 | Jager et al. .................. 222/192 |
| 3,329,964 A | * | 7/1967 | Mutscher et al. ............. 346/78 |
| 3,334,354 A | * | 8/1967 | Mutschler ................ 346/140.1 |
| 3,366,288 A | * | 1/1968 | Goldschein .................. 222/504 |
| 4,360,132 A | * | 11/1982 | Vilagi et al. ................. 222/504 |
| 4,646,676 A | * | 3/1987 | Kidder et al. ................ 118/243 |
| 4,711,379 A | * | 12/1987 | Price .......................... 222/504 |
| 4,852,773 A | * | 8/1989 | Standlick et al. ........... 222/504 |
| 5,039,061 A | * | 8/1991 | Heard et al. ................... 251/65 |
| 5,186,982 A | | 2/1993 | Blette et al. |
| 5,356,034 A | * | 10/1994 | Schlumberger ............... 222/61 |
| 5,405,050 A | * | 4/1995 | Walsh ........................... 222/1 |
| 5,495,667 A | * | 3/1996 | Farnworth et al. ............. 29/843 |
| 5,758,650 A | * | 6/1998 | Miller et al. ................. 600/461 |
| 6,250,515 B1 | * | 6/2001 | Newbold et al. ............ 222/504 |
| 6,269,846 B1 | * | 8/2001 | Overbeck et al. .............. 141/1 |
| 6,296,702 B1 | * | 10/2001 | Bryning et al. ............. 118/401 |
| 6,371,339 B1 | * | 4/2002 | White et al. ................. 222/413 |
| 6,467,700 B2 | * | 10/2002 | Vann et al. ............... 239/225.1 |

* cited by examiner

*Primary Examiner*—Frederick C. Nicolas
(74) *Attorney, Agent, or Firm*—Dorsey & Whitney, LLP

(57) ABSTRACT

A dispensation device having a nozzle defining a chamber and a dispensation orifice which communicates with the chamber. A transfer pin is moveably received within the chamber and moveable between a retracted position and a dispensing position. In the dispensing position, a portion of the contact end extends out of the chamber through the dispensation orifice. A driven element contacts the transfer pin, with the drive element magnetically coupled to a driven element. A drive element is oriented to magnetically move the driven element and thus magnetically position the transfer pin.

34 Claims, 5 Drawing Sheets

FLUID DISPENSER

RELATED APPLICATION DATA

This application claims priority of U.S. Provisional Patent Application No. 60/264,870, filed Jan. 29, 2001.

FIELD OF THE INVENTION

This invention generally relates to methods and devices for controllably dispensing liquids. More particularly, the invention relates to a device for precisely and consistently dispensing extremely small quantities of liquids, such as an adhesive.

BACKGROUND OF THE INVENTION

The assembly of small parts, such as lenses applied to fiber optic applications and flex suspension assemblies used in hard disk drives, frequently calls for the dispensation of nanoliter or sub-nanoliter volumes of applicable adhesive in precise amounts and locations. The two common methods of dispensing small quantities of liquid adhesives are based on (1) a "time flow" controller or (2) "positive displacement" by precision movement of a piston or auger. A time flow controller typically involves a valve being pneumatically opened for a precise time period to produce the flow of adhesive from a reservoir through a needle or dispensing tip. The volume extruded is a function of the amount of time the valve is open, the amount of pressure on the fluid, the viscosity of the fluid and the size of the dispensing tip. One problem with the time flow and positive displacement devices is the requirement for extremely accurate and repeatable "Z" axis (the space between the dispensing needle and the target substrate) positioning and control. In addition, these devices have somewhat limited use, because they are generally designed to require gravity assistance and thus require downward dispensation.

Another type of dispensing device generally involves an action similar to an ink-jet printer. The device operates by shooting small drops of adhesive onto the target substrate. When a very small dot of adhesive is required, the device shoots only one drop. However, if a larger dot is desired, the device shoots more than one drop in the same location on the target substrate. The "ink-jet" style of dispenser is nearly omnidirectional in operational position relative to the target. They are limited, however, to dispensing fluids with a viscosity of less than about 100 cps. The range of application (single drop) is about 1 pL to about 1 nL.

Another conventional method comprises a plurality of pins that are mechanically fixed to a plate in a pattern that matches the location of desired application. The pin ends are dipped in a pool of adhesive, which adheres to the ends. The plate with the "primed" pins is then positioned over the target substrate so that the adhesive on the pin ends is placed in contact with the substrate. Adhesive is transferred from the end of the pin to the substrate. The quality of the dot depends on the material, pin diameters, dwell time, and offset height. This process as applied in early embodiments worked well for building the large printed circuit boards used in early electronic devices. However, engineering the fixed pin plates for the tiny components required today would be extremely difficult and expensive. In addition, these fixtures were customized for a specific application which limited their use in modern "flexible" manufacturing.

Accordingly, a need exists for a liquid dispensing device which reduces the number of variables in determining the amount of dispensed liquid and easily controls the remaining variables, while remaining capable of dispensing extremely small, precisely reproducible volumes of liquids. That is, a need exists for a liquid dispensing device capable of dispensing extremely small, precisely reproducible volumes of liquids in precise locations without requiring extremely precise control of the position of the device with relation to the substrate in the Z-axis. A need also exists for a liquid dispensing device which is not limited to dispensation of fixed incremental amounts of liquid, but rather is capable of dispensing any amount along a dispensation continuum. A further need exists for a liquid dispensing device which is capable of dispensing extremely small, precisely reproducible volumes of liquids in any direction, not just downward.

SUMMARY OF THE INVENTION

The present invention is a liquid dispensing device that is capable of efficiently and easily dispensing extremely small, precisely reproducible volumes of liquids. In addition, the present invention distributes, in any direction, volumes of liquids which are not limited to fixed incremental amounts.

One embodiment is a liquid dispensation device. The embodiment comprises a pin element moveably oriented to move between a retracted position and an extended position. It further comprises a drive element operatively coupled with the pin element, wherein the drive element is operating the pin element. The embodiment may comprise an encasement defining a chamber and an orifice communicating with the chamber. The pin element may be slideably received within the chamber and can move between the retracted position and extended position. In the extended position, the pin element extends out of the chamber through the orifice.

Another embodiment comprises a contact element moveably oriented to move between a retracted position and an extended position, and a drive element operatively coupled with the contact element. In this embodiment, the drive element operates the contact element into contact with a substrate.

Yet another embodiment comprises a nozzle, a transfer pin, and a drive element. The nozzle defines a chamber and a dispensation orifice communicating with the chamber. The transfer pin is moveably received within the chamber and moveable between a retracted position and a dispensing position. In the dispensing position, a portion of the contact end extends out of the chamber through the dispensation orifice. The drive element is magnetically coupled with, and oriented to magnetically move, the transfer pin.

The embodiment may further comprise a liquid receiving opening in the nozzle which is in fluid communication with the chamber. The opening may be opposite the dispensation orifice. In this embodiment, the transfer pin may disengagingly contact the target substrate. The transfer pin further may be hydraulically restrained by the liquid in the chamber, and may inhibit any inadvertent escape of the liquid from the dispensation orifice.

Some embodiments may further comprise a drive element that is a magnet. The magnet may be a rare earth magnet, such as SmCo or NdFeB, or an electromagnet. Some embodiments may also comprise a drive element that is selectively moveable by fluid pressure. Some may further comprise a second drive element that is also a magnet. Some embodiments, in addition, may comprise a driven element that is magnetically coupled with the drive element and in contact with the pin element. Such a driven element is magnetically moved by the drive element.

Yet another embodiment is a dispensation device. The dispensation device comprises a nozzle defining a chamber and a dispensation orifice which communicates with the chamber. It further comprises a transfer pin moveably received within the chamber and moveable between a retracted position and a dispensing position. In the dispensing position, a portion of the contact end extends out of the chamber through the dispensation orifice. The embodiment further comprises a driven element in contact with the transfer pin, and a drive element magnetically coupled with the driven element. The drive element is oriented to magnetically move the driven element and thus magnetically positions the transfer pin.

The embodiment may comprise a second drive element acting concurrently with the drive element. Like the drive element, the second drive element is magnetically coupled with the driven element. In addition, the second drive element is oriented to magnetically move the driven element and thus magnetically positions the transfer pin.

The drive element may magnetically define a positional limit for the retracted position and dispensing position of the transfer pin. It may also magnetically control a contact force for the transfer pin with a target substrate. The drive element further may magnetically bias the transfer pin in a direction parallel to the direction of any movement of the drive element. In addition, the drive element may be selectively positioned by fluid pressure against an opposing spring tension. With an increase in fluid pressure, the drive element is biased toward the dispensation orifice, while a decrease in the fluid pressure biases the drive element away from the orifice.

Another aspect of the present invention is a method of dispensing liquid. One embodiment of the method comprises the first step of directing a quantity of liquid into a chamber defined by a nozzle. The chamber is in fluid communication with a dispensation orifice. The embodiment further comprises a second step of moving a transfer pin toward a substrate through the chamber, whereby the transfer pin carries an amount of liquid from the chamber to the substrate. The volume transferred is primarily a function of the transfer pin diameter and pin terminus shape. In an example operation, the inverted dispenser working in two modes, on a single part, dispenses a drop of 30–40 nL by time flow displacement and a 3–4 nL drop by pin transfer.

The embodiment may comprise the step of retracting the transfer pin to a retracted position in the chamber. The step of moving the transfer pin may further include magnetically moving the transfer pin, and may also include selectively moving the transfer pin by fluid pressure. The transfer pin may disengagingly contact the substrate and may also be hydraulically restrained by the liquid in the chamber.

Another embodiment comprises the step of directing a quantity of liquid into a chamber defined by a nozzle. The chamber is in fluid communication with a dispensation orifice. The embodiment comprises a second step of magnetically moving a transfer pin through the chamber and into contact with a substrate. As a result, the transfer pin carries an amount of liquid from the chamber to the substrate.

DETAILED DESCRIPTION

Figure 1:
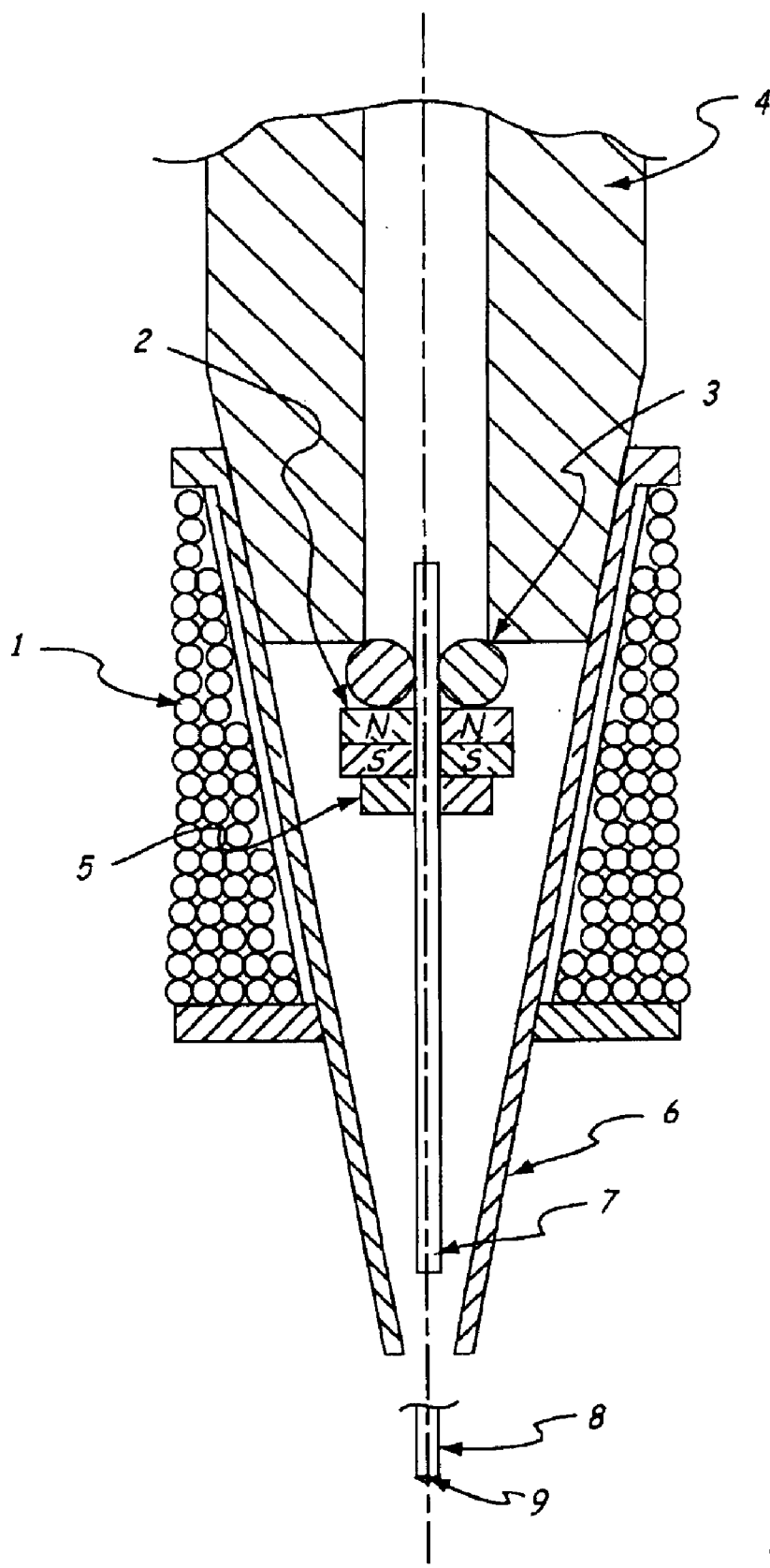
FIG. 1 is a diagram showing an electromagnetic embodiment of the invention.

FIG. 1 shows one embodiment of a liquid dispensation device, more specifically depicting an electromagnetic liquid dispensation device. The embodiment comprises an activating coil (1), a driven magnet (2), and a transfer pin (5).

In operation, the transfer pin (5), as a result of the electromagnetic activating coil (1), extends outside the plastic dispensation tip (6) for the application of liquid to the target substrate. The activating coil (1) moves the transfer pin (5) between the retracted (7) and extended (8) positions by acting magnetically on the transfer pin (5) or on the driven magnet (2) associated with the transfer pin (5).

The activating coil (1) acts upon the transfer pin (5) or driven magnet (2) in two ways. Inducing an electrical current in the coil (1) induces an electromagnetic force between the coil (1) and the driven magnet (2), which causes the transfer pin (5) to retract (7) in the plastic dispensation tip (6), thereby closing the shut off seal (3) against the syringe nozzle (4). Inducing an electrical current in the opposite direction causes the coil to electromagnetically move the transfer pin (5) to the extended position (8). In the extended position, the shut off seal (3) is open, making an adhesive dot (9) available to transfer to a target substrate. The transfer pin (5) position is determined by the direction of the DC current in the coil (1) and polarity of the driven magnet (2).

Figure 2:
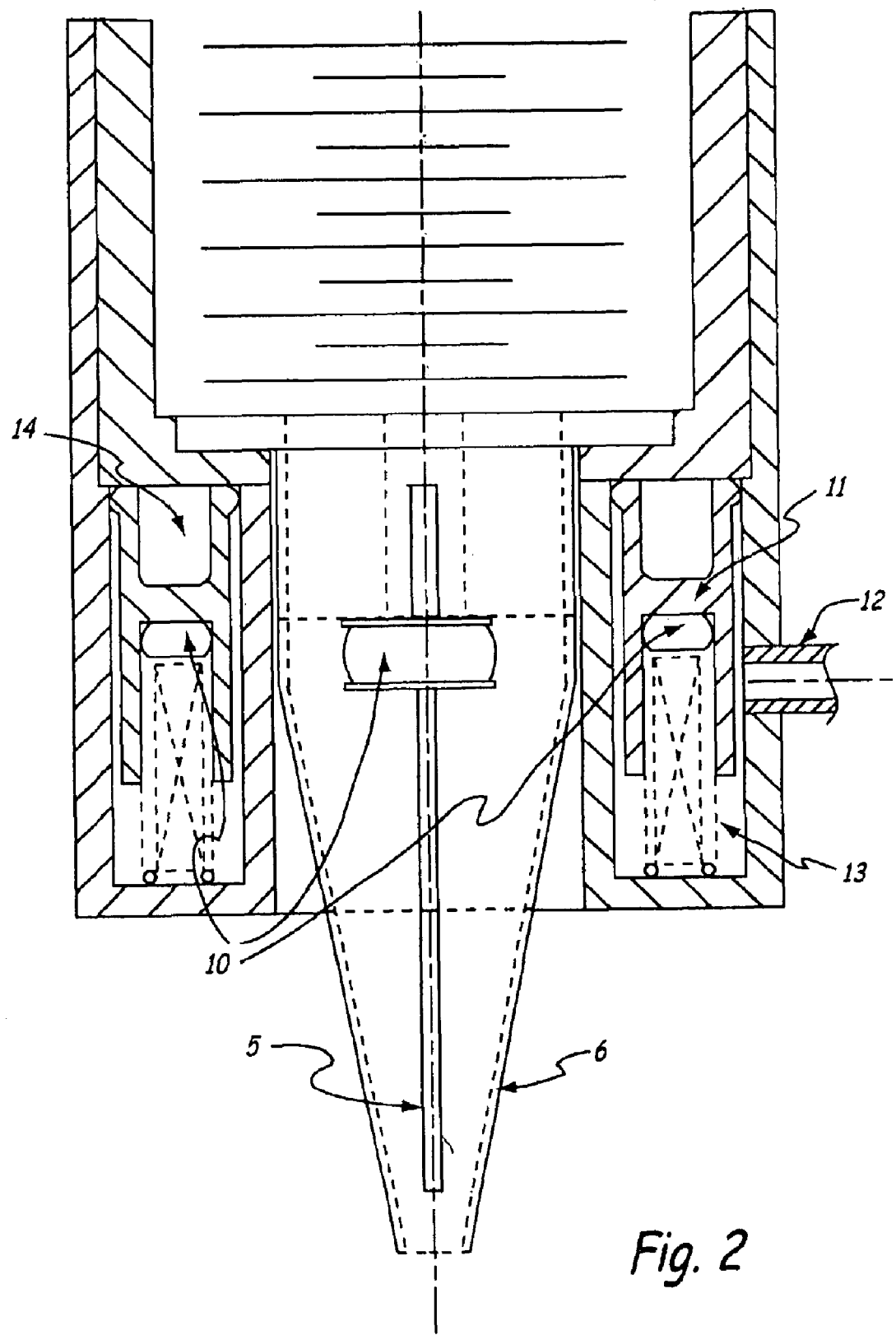
FIG. 2 is a diagram showing a rare earth magnet embodiment of the invention in the retracted position.

Another embodiment of the invention is shown in FIG. 2, which depicts a rare earth magnet liquid dispensation device. The three identical rare earth magnet buttons (10) are required for their magnetic strength. One example of a rare earth magnet capable of use in the invention is a NdFeB-36 magnet, such as that made by Edmund Industrial Optics. A retracting spring resting in a "U" cup (11) keeps the transfer pin in the retracted position until a vacuum is applied (12) to the "U" cup chamber (13). Atmospheric pressure in chamber (14) moves the "U" cup and the magnets, pulling along the transfer pin (5) via its magnet and thus extending the pin through the dispensation tip (6).

Figure 3:
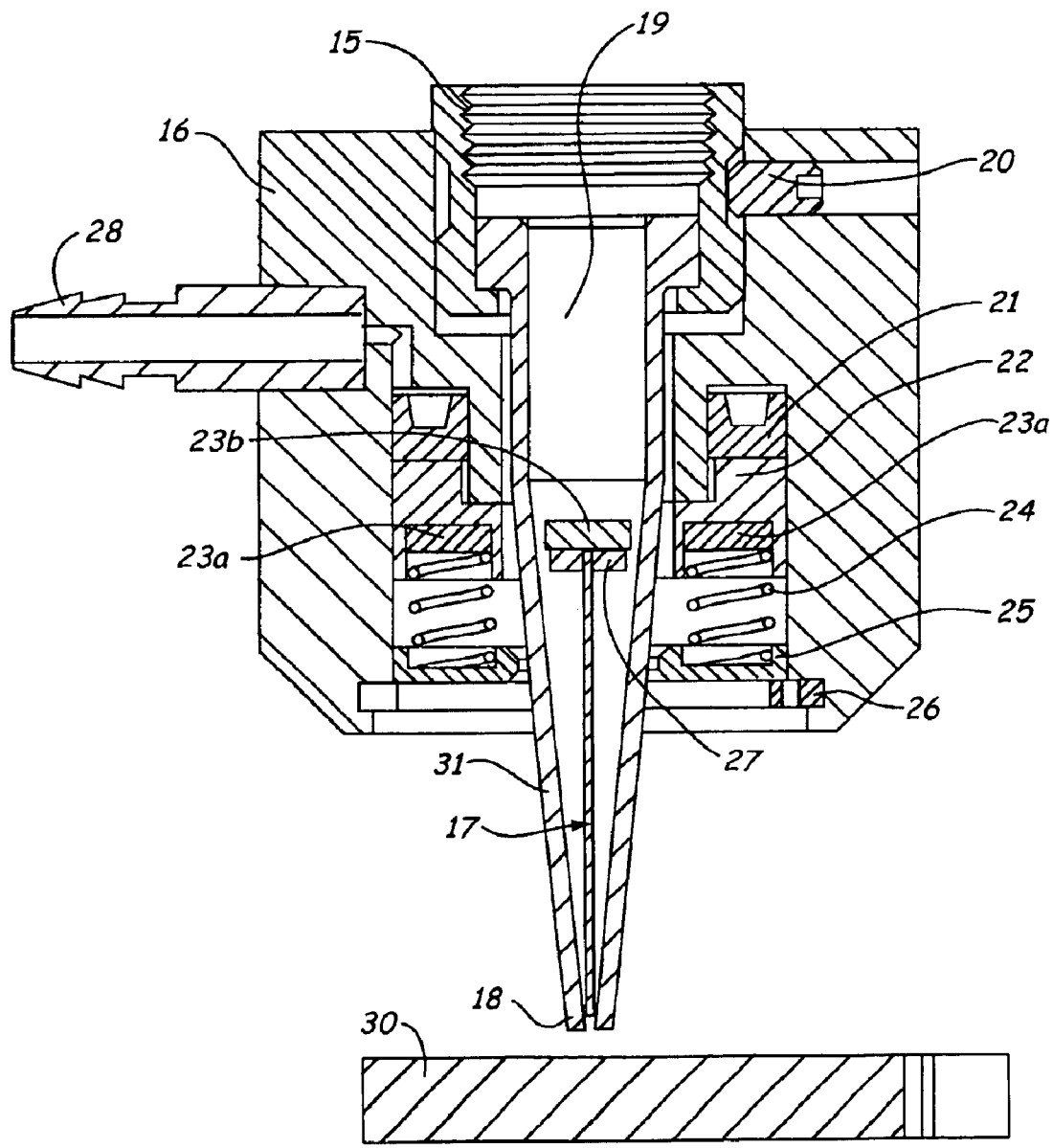
FIG. 3 is a diagram showing another rare earth magnet embodiment of the invention in the retracted position.
Figure 4:
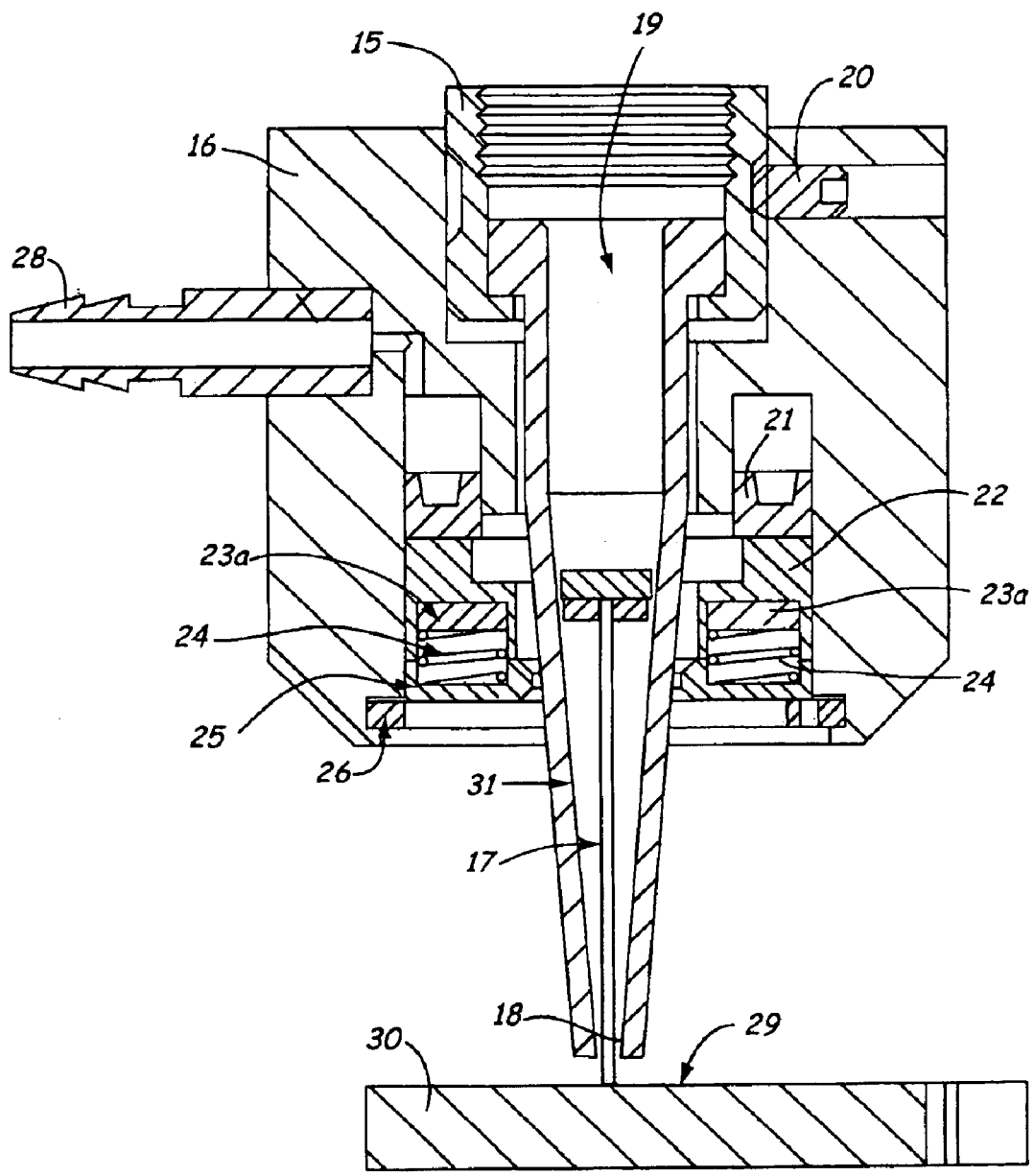
FIG. 4 is a diagram showing the rare earth magnet embodiment of FIG. 3 in the extended position.
Figure 5:
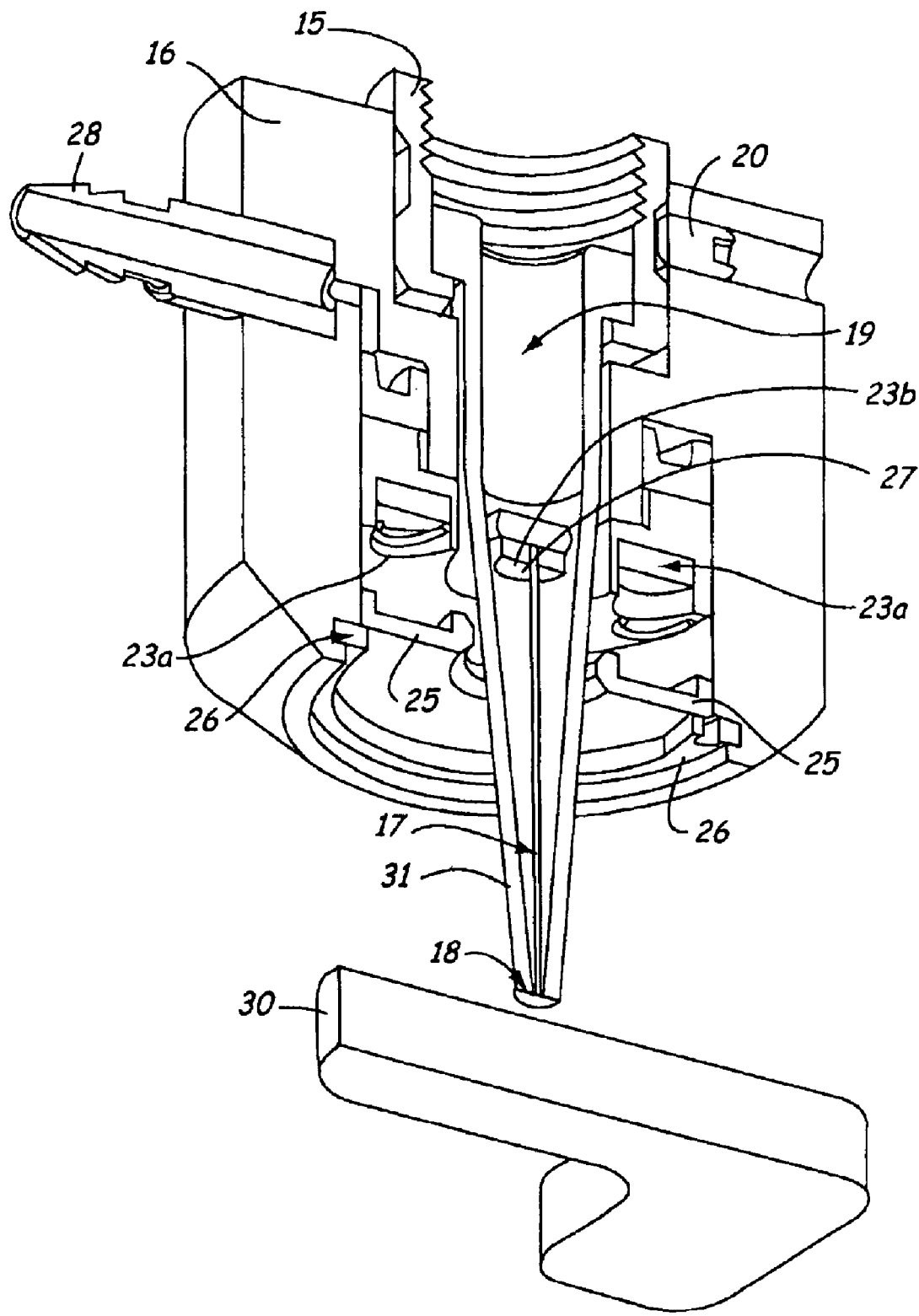
FIG. 5 is a diagram showing a perspective view of the rare earth magnet embodiment of FIG. 3 in the retracted position.

FIGS. 3, 4, and 5 show another rare earth magnet embodiment. FIG. 3 depicts the transfer pin (17) in the retracted position. The embodiment comprises an internally threaded stainless steel flange (15) through which the liquid dispensed by the invention may be received, and a machined aluminum cylinder (16) which is secured to the flange (15) by a set screw (20). The dispensing nozzle (31) is received and held in place by the flange (15) and contains the dispensing pin (17). The diameter of the pin in this embodiment is typically between 0.0005 and 0.003 inches less than the diameter of the nozzle orifice (18), depending on the physical properties of the material being dispensed. The material being dispensed fills the chamber (19) completely to the orifice.

The actuating mechanism consists of an annular lip seal (21) fabricated from a self-lubricating material, such as a MoS2 (Molybdenum Disulfide) impregnated synthetic rubber. The seal is in contact with the piston (22), which is fabricated from a polymeric material such as Delrin. The piston (22) holds a drive magnet (23a). The drive magnets are held in place by the retaining springs (24), which are in turn held by the retaining ring (25) which is secured by the snap ring (26). The actuating mechanism is activated by application of sufficient air pressure to the inlet (28). The pin assembly (17) consists of the stainless steel transfer pin (17), a washer (27) made of 400 series stainless steel and the driven magnet (23b). The pin (17) is press fit into the washer (27). The magnets (23a, 23b) are disks of rare earth magnetic material such as SmCo or NdFeB. The magnetization direction is oriented through the thickness of the disks, and the disks are installed such that the North/South orientation of both drive magnets (23a) are in the same direction while the North/South orientation of the driven magnet (23b) is in the opposite direction.

FIG. 4 shows the device with the transfer pin (17) in the dispensing position. The application of air pressure to the inlet (28) has caused the activation of the actuating mechanism by the force applied to the lip seal (21), collapsing the retaining springs (24) and moving the drive magnets (23a) toward the dispensing nozzle orifice (18). The motion of these drive magnets (23a) pulls the driven magnet (23b) along with them. The transfer pin passes out of the nozzle (31) carrying a droplet of material from the chamber (19). The droplet is transferred to the target substrate (30) at the contact point (29).

FIG. 5 is an isometric cross-section view of the device.

The volume of the droplet transferred is a function of the pin diameter, the surface tension, viscosity, and the contact angle between the transfer pin and the target substrate. In the case of vertical downward application, the time of contact contributes to the transfer volume. The time is controlled by the duration of the pulse of air moving the actuating mechanism. This dispenser can be used at any angle of approach. An adhesive reservoir such as that utilized in an EDF model 740 may be used to fill the chamber.

The present invention has time flow capabilities in conjunction with such a commercial reservoir. The use of time flow control may be useful in any number of situations, such as applying fluid dots of varying sizes on the same object. A dot is deposited by extending the transfer pin with the invented device in a vertical downward orientation, then activating the commercial device to time flow the proper amount of fluid to attain the desired dot size. The transfer pin acts to guide the flowing fluid. Next, the transfer pin can be retracted and either the object or the present invention is moved to the next target location. The transfer pin is then activated to place another dot of any desired size, as described in the above text.

The present invention is desirable because the motion of the transfer pin is slowed by the hydraulic dampening effect of the fluid being transferred, thus allowing the transfer pin to come into gentle contact with the substrate. The result is an extremely low velocity impact. This advantage is important because it aids the repeatability of the volume of fluid transferred, prevents damage to the target substrate, and eliminates the need for the expensive and elaborate "Z" height measurement and control which is required by the industry's standard "contact" adhesive dispensing processes (in which the adhesive is transferred by contact with the substrate while the dispenser is held at an extremely precise "Z" distance).

The contact force of the transfer pin of the present invention actually decreases after contact with the target substrate. The force of the transfer pin acting on the substrate contact point is determined by the magnetic coupling force acting between the driven and drive magnets. In the retracted position, the three magnets are aligned in a plane, as shown in FIG. 3. In FIG. 4, the contact of the transfer pin with the substrate in the dispensing position precludes the alignment of the magnets in a plane. The greater the distance between the drive and driven magnets, the lower the force acting on the contact point.

Although the present invention has been described in detail with reference to certain embodiments thereof, it may be embodied in other specific forms without departing from the essential spirit or attributes thereof. For example, the teachings of the present invention are applicable to many different kinds of precision fluid applications and to many possible actuating device applications. Furthermore, the invention can be adapted to existing positive displacement or time flow fluid dispensing equipment.

The present invention offers many advantages over conventional liquid dispensing devices. Generally, the present invention reduces the number of variables in determining the amount of dispensed liquid and easily controls the remaining variables, while remaining capable of dispensing extremely small, precisely reproducible volumes of liquids. More specifically, the present invention does not require extremely precise control of the position of the device with relation to the substrate. The present liquid dispensing device may be used to construct extremely small components as required for micro assemblies and other detailed manufacturing. The present invention is further capable of dispensing any amount of liquid along a dispensation continuum, rather than being limited to fixed increments of liquid. In addition, the present invention may be used for dispensation of liquid in any direction.

An electromagnetic embodiment may be desirable because electrical resistance in the activation coil generates heat, which decreases the viscosity of the liquid. Magnetic embodiments may be particularly desirable because they always apply a constant or decreasing pressure to the target substrate. That is, in moveable spring-based devices in the prior art, the pressure applied to the applicator increases as the applicator is extended and may cause a relatively higher impact with the target substrate. In contrast, the magnetic embodiments of the present invention result in an extremely low impact contact between the transfer pin and the target substrate because the pressure on the transfer pin remains constant or decreases.

Those skilled in the art will recognize that the accompanying figures and this description depicted and described embodiments of the present invention, and features and components thereof. With regard to means for fastening, mounting, attaching or connecting the components of the present invention to form the mechanism as a whole, unless specifically described otherwise, such means were intended to encompass conventional fasteners such as machine screws, nut and bolt connectors, machine threaded connectors, snap rings, screw clamps, rivets, nuts and bolts, toggles, pins and the like. Components may also be connected by welding, friction fitting, adhesives, or deformation, if appropriate. Unless specifically otherwise disclosed or taught, materials for making components of the present invention were selected from appropriate materials, such as metal, metallic alloys, fibers, polymers and the like, and appropriate manufacturing or production methods including casting, extruding, molding and machining may be used. In addition, any references to front and back, right and left, top and bottom and upper and lower were intended for convenience of description, not to limit the present invention or its components to any one positional or spacial orientation. Therefore, it is desired that the embodiments described herein be considered in all respects as illustrative, not restrictive, and that reference be made to the appended claims for determining the scope of the invention.

What is claimed is:

1. A liquid dispensation device, comprising:
   a) a pin element moveably oriented to move between a retracted position and an extended position, wherein a portion of the pin element is in contact with a substrate; and b) a drive element operatively coupled with the pin element, wherein the drive element is operating the pin element, wherein the drive element is not mechanically coupled with the pin element, wherein the drive element is a magnet, wherein the drive element is selectively moveable by fluid pressure.

2. The device of claim 1 further comprising an encasement defining a chamber and an orifice communicating with the chamber, wherein the pin element is slideably received within the chamber, the pin element moving between the retracted position and the extended position, the extended position describing a portion of the pin element extending out of the chamber through the orifice.

3. The device of claim 1 wherein the magnet is a rare earth magnet.

4. The device of claim 3 wherein the rare earth magnet is SmCo.

5. The device of claim 3 wherein the rare earth magnet is NdFeB.

6. The device of claim 1 further comprising a second drive element, the second drive element being a magnet.

7. The device of claim 1 further comprising a driven element in contact with the pin element, the driven element being magnetically coupled with the drive element, wherein the drive element is oriented to magnetically move the driven element.

8. A liquid dispensation device, comprising:
a) a contact element moveably oriented to move between a retracted position and an extended position; and
b) a drive element operatively coupled with the contact element, wherein the drive element is configured to operate the contact element into contact with a substrate, wherein the drive element is not mechanically coupled with the contact element, wherein the drive element is a magnet magnetically coupled with the contact element, wherein the drive element is selectively moveable by fluid pressure.

9. The device of claim 8 further comprising an encasement defining a chamber and an orifice communicating with the chamber, wherein the contact element is slideably received within the chamber, the contact element moving between the retracted position and the extended position, the extended position describing a portion of the contact element extending out of the chamber through the orifice.

10. The device of claim 8 further comprising a second drive element, the second drive element being a magnet.

11. The device of claim 8 further comprising a driven element in contact with the contact element, the driven element being magnetically coupled with the drive element, wherein the drive element is oriented to magnetically move the driven element.

12. A liquid dispensation device, comprising:
a) a nozzle defining a chamber;
b) a transfer pin having a contact end, the transfer pin moveably received within the chamber and moveable between a retracted position and a dispensing position, wherein a portion of the transfer pin is in contact with a substrate;
c) a drive element magnetically coupled with the transfer pin, wherein the drive element is oriented to magnetically move the transfer pin, wherein the drive element is not mechanically coupled with the transfer pin; and
d) a second drive element, the second drive element being a selectively moveable magnet.

13. The device of claim 12 further comprising a driven element in contact with the transfer pin, the driven element being magnetically coupled with the drive element, wherein the drive element is oriented to magnetically move the driven element.

14. The device of claim 12, further comprising a liquid receiving opening in the nozzle, the liquid receiving opening being in fluid communication with the chamber.

15. The device of claim 14 wherein the liquid receiving opening is opposite the dispensation orifice.

16. The device of claim 12 wherein the transfer pin in the dispensing position disengagingly contacts a target substrate.

17. The device of claim 12 wherein the transfer pin motion is hydraulically restrained by the liquid in the chamber.

18. The device of claim 12 wherein the transfer pin inhibits any inadvertent escape of the liquid from the dispensation orifice.

19. A dispensation device, comprising
a) a nozzle defining a chamber and a dispensation orifice communicating with the chamber;
b) a transfer pin having a contact end, the transfer pin moveably received within the chamber;
c) a first drive element magnetically coupled with the transfer pin, the first drive element oriented to magnetically urge the transfer pin into contact with a substrate, wherein the first drive element is not mechanically coupled with the transfer pin, wherein the first drive element is selectively positioned by fluid pressure against an opposing spring tension, the fluid pressure increasing to bias the first drive element toward a substrate, the first drive element being biased away from the substrate by a decrease in the fluid pressure.

20. The device of claim 19, further comprising a second drive element acting concurrently with the first drive element, the second drive element magnetically coupled with the transfer pin, the second drive element being oriented to magnetically urge the transfer pin.

21. The device of claim 19 wherein the first drive element magnetically defines a positional limit for a retracted position and a dispensing position of the transfer pin.

22. The device of claim 21 wherein the first drive element magnetically controls a contact force for the transfer pin with a target substrate.

23. A liquid dispensation device, comprising
a) a contact element moveably oriented to move between a retracted position and an extended position; and
b) a drive element operatively coupled with the contact element, wherein the drive element is not mechanically coupled with the contact element, wherein the drive element is configured to operate the contact element into contact with a substrate, the drive element being selectively moveable by fluid pressure, wherein the drive element is a magnet.

24. The device of claim 23 further comprising a second drive element, the second drive element being a magnet.

25. The device of claim 23 further comprising a nozzle defining a chamber and a dispensation orifice communicating with the chamber, wherein the contact element is slideably receivable within the chamber.

26. The device of claim 25 wherein the contact element is configured to move between a retracted position and an extended position in which a portion of the contact element extends out of the chamber through the dispensation orifice.

27. The device of claim 23 further comprising a driven element associated with the contact element, the drive element being configured to urge the driven element into contact with the substrate.

28. The device of claim 27 wherein the transfer pin is magnetically positionable by the drive element, the drive element being selectively moveable by fluid pressure.

29. A method of dispensing liquid, comprising the steps of:
   a) directing a quantity of liquid into a chamber defined by a nozzle, the chamber being in fluid communication with a dispensation orifice; and
   b) selectively moving a transfer pin by fluid pressure toward a substrate through the chamber, wherein the transfer pin is not mechanically coupled to any drive element, whereby the transfer pin contacts the substrate, wherein selectively moving the transfer pin by fluid pressure further comprises selectively moving a first drive element by fluid pressure, the first drive element being operably coupled with the transfer pin, wherein the first drive element is a magnet.

30. The method of claim 29 wherein selectively moving a first drive element by fluid pressure further comprises moving a driven element associated with the transfer pin, the first drive element being operably coupled with the driven element.

31. The method of claim 29, further comprising selectively moving a second drive element by fluid pressure, the second drive element being operably coupled with the transfer pin.

32. The method of claim 29 wherein selectively moving the transfer pin further comprises magnetically moving the transfer pin.

33. The method of claim 29 wherein the transfer pin motion is hydraulically restrained by the liquid in the chamber.

34. The method of claim 29 wherein selectively moving the transfer pin by fluid pressure toward the substrate through the chamber further comprises carrying an amount of liquid from the chamber to the substrate without gravitational assistance.

* * * * *